United States Patent [19]

McIntyre et al.

[11] 3,714,491

[45] Jan. 30, 1973

[54] QUADRANT PHOTODIODE

[75] Inventors: Robert John McIntyre, Pointe Claire; Howard Charles Springings, Chateauguay, both of Canada

[73] Assignee: RCA Limited, Montreal, Quebec, Canada

[22] Filed: April 13, 1970

[21] Appl. No.: 27,618

[52] U.S. Cl. .....................313/96, 250/211, 250/220, 317/235 IV, 317/235 AJ

[51] Int. Cl. ...........................H01j 39/06, H01l 15/06

[58] Field of Search ........313/96, 94, 65 A, 101, 102, 313/65 AB; 250/211 J

[56] References Cited

UNITED STATES PATENTS

| | | | |
|---|---|---|---|
| 2,986,591 | 5/1961 | Swanson et al. | 210/211 J X |
| 3,293,440 | 12/1966 | Mueller | 250/211 J |
| 3,496,363 | 2/1970 | Rome | 313/96 X |
| 3,514,658 | 5/1970 | Davis et al. | 313/96 |
| 3,539,883 | 11/1970 | Harrison | 250/211 J |
| 2,716,203 | 8/1955 | Sen et al. | 313/101 X |
| 3,210,548 | 10/1965 | Morrison | 250/203 X |
| 3,444,381 | 5/1969 | Wendland | 250/211 J |
| 3,535,525 | 10/1970 | Minkowitz | 250/203 X |
| 3,593,067 | 7/1961 | Flynn | 317/234 R |
| 3,523,208 | 8/1970 | Bodmer et al. | 313/65 AB X |

FOREIGN PATENTS OR APPLICATIONS

| | | | |
|---|---|---|---|
| 1,063,317 | 3/1954 | France | 313/96 |

*Primary Examiner*—Robert Segal
*Attorney*—Glenn H. Bruestle

[57] ABSTRACT

A quadrant photodiode including a flat substrate of high resistivity semiconductor material, such as silicon, of one conductivity type having a thin region of the one conductivity type within and extending across one surface thereof and four quadrant shaped regions of the opposite conductivity type in its other surface. The quadrant shaped regions are arranged in a circle with the straight edges of adjacent quadrants being in closely spaced relation. The surface of the substrate having the one conductivity type region therein is provided with V-shaped grooves which are directly opposed to and extend along the spaces between the edges of the quadrant-shaped regions. The surfaces of the grooves serve to refract the light which is incident on the surface toward the quadrant-shaped regions so as to prevent optical cross-talk between the quadrant-shaped regions.

7 Claims, 6 Drawing Figures

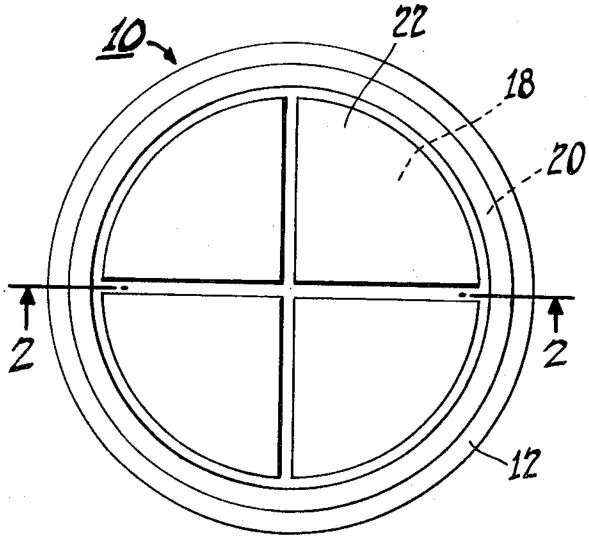
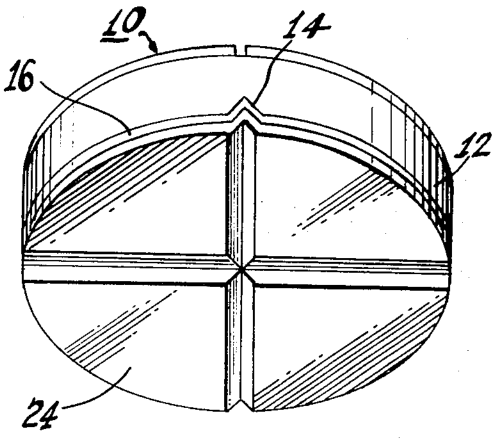
FIG. 1.
FIG. 3.
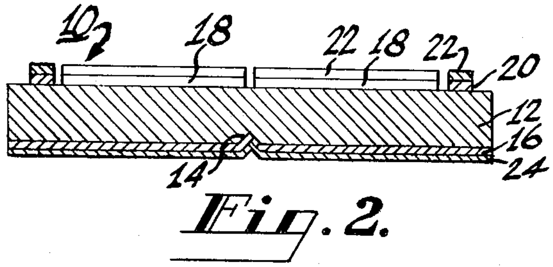
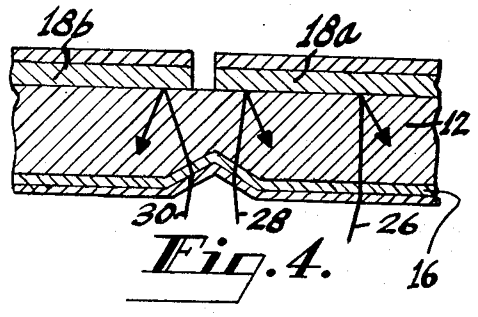
FIG. 2.
FIG. 4.
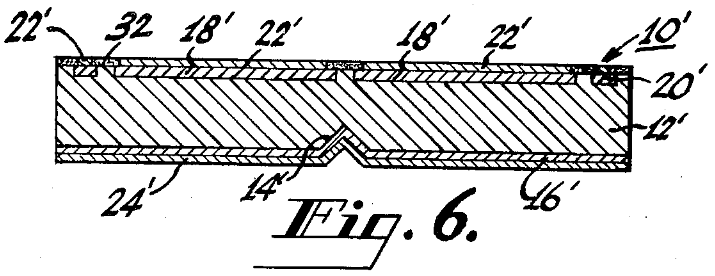
FIG. 6.
INVENTORS
ROBERT J. McINTYRE &
BY HOWARD C. SPRIGINGS
Donald S. Cohen
Attorney INVENTORS
ROBERT J. McINTYRE &
BY HOWARD C. SPRIGINGS
Donald S. Cohen
Attorney

QUADRANT PHOTODIODE

BACKGROUND OF THE INVENTION

The present invention relates to a photodiode and more particularly to a P-I-N quadrant photodiode used for tracking the position of a beam of light which is moved across the diode.

Recently P-I-N quadrant photodiodes have been developed for tracking a beam of focused light which is moved over the diode. In general, such diodes comprise a flat substrate of high resistivity, higher than 10,000 ohm-cm, P type silicon having a P type anode region extending over one surface and four quadrant shaped N type electrodes on the other surface. When a focused light spot is moved across the anode the signal is transferred from one of the quadrant shaped electrodes to the next. The abruptness with which this transfer occurs determines the positional resolution of the diode. Heretofore this positional resolution has been determined by the distance between adjacent quadrant electrodes and the optical cross-talk between adjacent quadrant electrodes.

The factor of the distance between the adjacent quadrants which effects the positional resolution of the diode can be minimized by reducing the physical separation between the adjacent quadrants. It has been found possible to reduce the spacing between adjacent quadrants to such an extent that the effective spacing is less than 0.004 inch as determined optically by using light at a wavelength of 0.9$\mu$m. However, for light at longer wavelengths, for example at 1.06$\mu$m, the positional resolution has been limited by optical cross-talk between the quadrants. This is a result of the fact that the absorption coefficient of silicon at the long light wavelengths is relatively small so that a fair fraction of the incident radiation reaches the quadrant electrode side of the diode and is reflected from it. Since this type of photodiode is usually used with optical systems having relatively low *f* numbers, the incident cone of radiation on the anode surface, although focused, continues to spread out inside the diode. It has been estimated that for a *f*:1 optical system, the effect of cross-talk will limit the positional resolution to about 0.010 inch. Therefore, it would be desirable to be able to minimize, if not prevent, optical cross-talk between the quadrants so as to improve the positional resolution of the diode.

SUMMARY OF THE INVENTION

A photodiode comprises a substrate of high resistivity semiconductor material having opposed flat surfaces and a V-shaped groove in one of the surfaces. A region of one conductivity type semiconductor material is adjacent to and extends across substantially the entire one surface of the substrate. A pair of regions of the opposite conductivity type semiconductor material are adjacent the other surface of the substrate. The pair of regions have edges which are in closely spaced relation with the spacing between the edges being directly opposed and extending along the grooves in the one surface of the substrate.

BRIEF DESCRIPTION OF DRAWINGS

FIG. 1 is a plan view of one surface of one embodiment of the photodiode of the present invention.

FIG. 2 is a sectional view of the photodiode taken along line 2—2 of FIG. 1.

FIG. 3 is a perspective view of the photodiode of FIG. 1 showing the other surface of the diode.

FIG. 4 is an enlarged sectional view of a portion of the photodiode.

FIG. 6 is a sectional view of another embodiment of the photodiode of the present invention.

DETAILED DESCRIPTION

Figure 5:
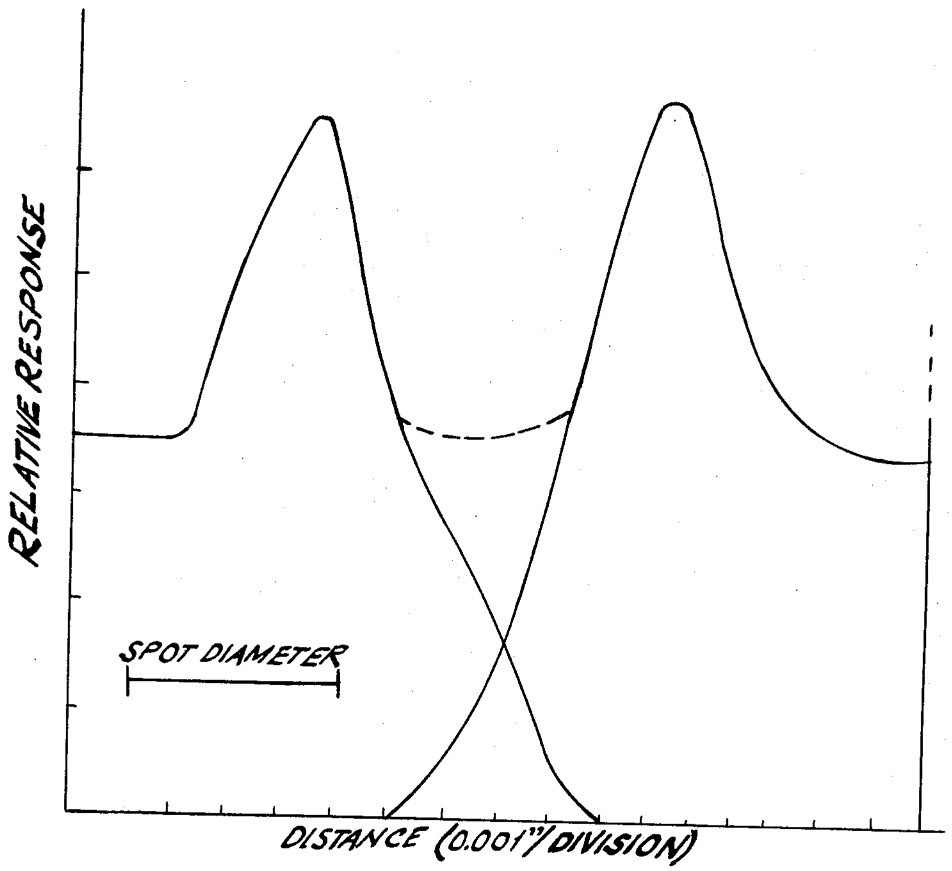
FIG. 5 is a graph showing the signal response of a typical photodiode of the present invention.

Referring to FIGS. 1–3, an embodiment of the photodiode of the present invention is generally designated as 10. Photodiode 10 comprises a circular substrate 12 of a high resistivity semiconductor material having opposed flat surfaces. Typically the substrate 12 is of P type silicon having a resistivity greater than 10,000 ohm-cm. As shown in FIGS. 2 and 3, the substrate 12 has a pair of V-shaped grooves 14 in one of its flat surfaces. The grooves 14 extend diametrically across the substrate 12 and are positioned 90° apart.

A thin region 16 of P type conductivity is within and extends across the entire grooved surface of the substrate 12 including the surfaces of the grooves 14. The P type region 16 provides the anode of the diode 10. In the other surface of the substrate 12 are four quadrant shaped regions 18 of N type conductivity. The quadrant shaped regions 18 are arranged in a circle with each straight edge of each quadrant being in closely spaced relation to a straight edge of an adjacent quadrant. As shown in FIG. 2, the quadrant shaped regions 18 are positioned so that the spaces between the edges of the quadrants are directly opposed to and extend along the grooves 14 in the substrate. Thus, the spaces between the edges of the quadrant extend radially from a single point, the center of the surface of the substrate 12, which is directly opposed to the crossing point of the grooves 14. A narrow, annular guard ring region 20 of N type conductivity is in the same surface of the substrate 12 as the quadrant regions 18. The guard ring 20 surrounds and is spaced from the quadrant regions 18. A film 22 of a light reflecting material, such as aluminum, is coated over the surface of the quadrant regions 18 and the guard ring 20. A film 24 of a light anti-reflecting material, such as a thin film of silicon-dioxide, is coated over the P type region 16. The silicon dioxide film 24 should have an optical thickness of approximately one-fourth wavelength depending on the wavelengths of the light being detected.

To make the photodiode 10, one starts with a flat substrate of high resistivity P type semiconductor material, such as silicon. The V-shaped grooves 14 are then formed in one surface of the substrate. This can be achieved by lapping, grinding, etching or ultrasonically cutting with a wedge shaped tool. A P type impurity, such as boron, is diffused into the grooved surface of the substrate to provide the P type anode region 16, and an N type impurity, such as phosphorus, is diffused into the other surface of the substrate to provide the N type quadrant regions 18 and the guard ring region 20. The P type impurity and the N type impurity may be diffused into the substrate using any well known diffusion technique. For example, the surfaces of the substrate may be coated with a material containing the particular impurity and then heated to diffuse the impurity into the substrate, or the impurity may be diffused into the substrate from a gas containing the impurity. Also, depending on the diffusion technique used, both impurities may be diffused into the substrate simultaneously or one at a time. After the diffusion operation, the quadrant regions 18 and guard ring region 20 are defined in the N type region. This can be achieved by coating the surface of the N type diffused region with a masking layer of silicon dioxide. Openings are provided into the masking layer along the lines of the spaces between the quadrant regions and the space between the quadrant regions and the guard ring region using the photo-lithographic technique well known in the art. The exposed area of the N type region is then etched away to form the quadrant regions and the guard ring region. The light reflection film 22 and the anti-light reflecting film 24 are then coated over the quadrant regions 18, guard ring region 20 and P type region 16 respectively by evaporation of the material of the films in a vacuum.

In the use of the photodiode 10, a spot of light is focused on the P type anode region 16 and scanned thereacross. This generates electron-pairs with the holes being collected by the common anode 16 and the electrons being collected by the quadrant electrodes 18. By measuring the response of the quadrant electrodes 18, the position of the light beam can be determined. Referring now to FIG. 4, as the light beam moves over the portion of the P type anode region 16 which is between the grooves 14, the incident light generates electron-hole pairs the electrons of which are collected by the quadrant electrode **18*a* directly opposite the point of incidence as indicated by line 26 in FIG. 4. As the beam of light moves onto a surface of a groove 14, the light incident on the angled surface of the groove is refracted back to the quadrant electrode 18*a* as indicated by line 28 in FIG. 4. As the beam of light moves onto the other surface of the groove 14, the light incident on the angled other surface is refracted toward the next adjacent quadrant electrode 18*b* as indicated by the line 30 in FIG. 4. Thus, the electrons generated by all light incident on the sides of the grooves are collected by an appropriate quadrant electrode so as to eliminate optical cross-talk between the quadrant electrodes. The width and length of the grooves 14** are not critical as long as the sides of the grooves are angled so as to refract the light toward the proper quadrant electrode.

Referring to FIG. 5, there is shown the relative signal response on two adjacent quadrant electrodes of a photodiode 10 as a beam of light was scanned across the P type anode. The light was of a wavelength of 1.06$\mu$m, was 0.004 inches in diameter and was focussed on the photodiode using an *F:2* optical system. As the light was scanned across the photodiode the response on each of two adjacent quadrant electrodes was measured and is shown in FIG. 5. As can be seen in FIG. 5, the signal response on each quadrant electrode is characterized by three regions. Going from left to right on the graph, the first region is a flat region wherein the light is entirely on a flat surface of the P type anode. The next region is one of increasing response wherein the light moves onto an angled surface of a groove. This region of increasing response is attributable to enhanced quantum efficiency resulting from the fact that the light incident on the side of the groove is totally internally reflected and becomes trapped in the diode. The third region is one of rapid fall-off as the light moves from one side of the groove to the other. As the light moves from one side of the groove to the other, a signal response of increasing magnitude is obtained in the adjacent quadrant electrode. The dotted line in the graph is the total of the two signals in the adjacent quadrant electrodes as the light moves across the bottom of the groove. As can be seen, the total response at the bottom of the groove is about the same as at the flat surface of the P type anode. From FIG. 6 it can be seen that the effective resolution of the photodiode is about 0.004 inches, which is mainly determined by the diameter of the beam of light. Thus, the photodiode has an effective resolution as good as that which was previously obtained using a beam of light of shorter wavelength.

Referring to FIG. 6, there is shown another embodiment of the photodiode, generally designated as 10' is made starting with a flat substrate 12' of a high resistivity P type semiconductor material, such as silicon. A pair of V-shaped grooves 14' and formed in one surface of the substrate 12' in any of the manners previously described with regard to the photodiode 10. A P type impurity, such as boron, is diffused into the grooved surface of the substrate to provide a thin P type anode region 16'. A masking layer 32 of silicon dioxide is coated on the other surface of the substrate. Openings are formed in the masking layer 32 using the well known photo-lithographic techniques, which openings are of the size, shape and position of the quadrant regions and guard ring region to be formed. An N type impurity, such as phosphorus, is then diffused into the exposed area of the masked surface of the substrate to provide the quadrant regions 18' and the guard ring region 20'. A light reflecting film 22' is then coated over the quadrant regions 18' and an anti-reflecting film 24' is coated over the P type anode region 16'. The photodiode 10' operates in the same manner as the photodiode 10 previously described.

Although the photodiode 10 has been described as having a P type substrate, a P type anode region and N type quadrant and guard ring regions, the photodiode can be made with a high resistivity N type substrate, an N type anode region and P type quadrant and guard ring regions. Such a photodiode would be made in the same methods as previously described except that one would start with a flat substrate of high resistivity N type semiconductor material, an N type dopant, such as phosphorus, would be diffused at the grooved surface of the substrate to provide the another region, and a P type dopant, such as boron, would be diffused into the other surface of the substrate to provide the quadrant and guard ring regions.

We claim:

1. A photodiode comprising a substrate of high resistivity semiconductor material of one conductivity type having opposed flat surfaces and a V-shaped groove in one of said surfaces;

a region of the one conductivity type semiconductor material adjacent to and extending across substantially the entire one surface of the substrate; and a pair of regions of the opposite conductivity type semiconductor material adjacent the other surface of the substrate, said pair of regions having edges in closely spaced relation with the spacing between said edges being directed opposed and extending along the groove in the one surface of the substrate.

2. A photodiode in accordance with claim 1 in which the region of one conductivity type extends across the surface of the groove as well as the one flat surface of the substrate.

3. A photodiode in accordance with claim 2 including a layer of a ligh reflecting material covering each of said pair of regions.

4. A photodiode in accordance with claim 3 in which the region of one conductivity type is P type and the pair of regions are N type conductivity.

5. A photodiode in accordance with claim 3 in which the region of one conductivity type is N type and the pair of regions are P type conductivity.

6. A photodiode in accordance with claim 1 including four regions of the opposite conductivity type semiconductor material adjacent the other surface of the substrate, each of said four regions having a pair of edges with each edge being in closely spaced relation to an edge of a separate one of another of said four regions, and the one surface of the substrate has a plurality of V-shaped grooves therein with the grooves being directly opposed and extending along the spacing between the edges of said four regions.

7. A photodiode in accordance with claim 6 in which the spaces between the edges of the four regions extend from a single point on the other surface of the substrate.

* * * * *